RANDOM ACCESS DEVICE FOR MAGNETIC CARD STORAGE

Jan. 10, 1967 D. N. MacDONALD ET AL 3,298,007

RANDOM ACCESS DEVICE FOR MAGNETIC CARD STORAGE

Filed April 15, 1963 13 Sheets-Sheet 9

Jan. 10, 1967 D. N. MacDONALD ET AL 3,298,007

RANDOM ACCESS DEVICE FOR MAGNETIC CARD STORAGE

Filed April 15, 1963 13 Sheets-Sheet 10

Jan. 10, 1967 D. N. MacDONALD ET AL 3,298,007

RANDOM ACCESS DEVICE FOR MAGNETIC CARD STORAGE

Filed April 15, 1963 13 Sheets-Sheet 11

3,298,007

RANDOM ACCESS DEVICE FOR MAGNETIC CARD STORAGE

Duncan N. MacDonald, Arcadia, Shahbuddin A. Billawala, Pasadena, and Alpheus F. Stansell, West Covina, Calif., assignors to Burroughs Corporation, Detroit, Mich., a corporation of Michigan Filed Apr. 15, 1963, Ser. No. 273,027
14 Claims. (Cl. 340—174.1)

This invention relates to apparatus for storing large amounts of digitally coded information, and more particularly is concerned with information storage apparatus in which any piece of stored information can be selected at random for readout within a time interval that is substantially independent of the information selected.

With the increase in speed and capacity of digital computers and other digital devices for processing digital information, there has developed a need, particularly in the business and commercial field, for convenient means of storing large amounts of information. Not only has the need been to provide storage for large quantities of information, but such storage facility must have the capability of retrieving any selected piece of information in the shortest possible time. Storage devices have been developed which provide random access to pieces of information in extremely short periods of time. The magnetic core memory is an example of such a device. However, the cost of such devices increases almost directly with the storage capacity which they have.

Where large amounts of information are to be stored, the magnetic tape recorder has found favor in the past. Large amounts of digital information can be stored on single reels of magnetic tape and the reels of tape can be replaced to increase the ultimate storage capacity of the tape unit without materially adding to the cost. However, the retrieval time of information from magnetic tape is limited because the tape must be scanned from beginning to end to seek out a particular piece of information. Using shorter length tapes and providing more tape units can reduce the access time, but increases the cost of the storage equipment.

The shortcomings of the conventional magnetic tape storage device are overcome in the present invention in which a storage device uses stacks of cards on which the digital information is recorded magnetically in parallel chanels on the surface of each card. Thus, in effect, the more conventional magnetic tape is broken down into a large number of separate units which correspond in length to the width of the card. The access time to each of these unit lengths of magnetic storage strips is the same; thus random access to the individual channels on the cards is provided.

The present invention is particularly directed to a mechanism by which access can be made to any one of the cards in a stack of cards and to a channel of magnetically recorded information on the selected card. The card selecting mechanism permits the cards to be stored as a deck of a hundred cards or more. Each card may have ten or more channels of information recorded across each surface of the card. By the arrangement of the present invention, the deck of cards can be cut at any selected point to expose the opposing surfaces of two adjacent cards. The cards can then be scanned along any selected channel on either of the cards to read out or record information in the selected channel. The time required to address and scan a particular channel of information is independent of the location of that channel in the deck of cards. The total access time may be only a few seconds while the amount of information stored in the deck of cards may be equivalent to about five reels of magnetic tape.

In brief, the random access memory device of the present invention utilizes a deck of flat cards, the cards being arranged in equal numbers of cards. Each card is provided with tabs along the edges thereof, the tabs of the cards in any one group of cards being offset from each other along the margins of the cards so that each card in a group can be identified from the other cards within a group by the relative position of the associated tabs. The positional pattern of the tabs is repeated for each group of cards in the deck. First and second groups of fingers are provided which are supported on a carriage, the carriage being movable to place the finges in position adjacent the border of any one of the plurality of groups of cards. Selected individual fingers in the two groups can be moved into engagement with the aligned tabs of any two adjacent cards in the group. With the selected fingers being in engagement with the tabs, the two groups of fingers pull the adjacent cards in the group apart, separating the deck into two sections. The two parts of the deck are moved apart so that the selected cards are moved into fixed predetermined positions permitting a transducer to be scanned between the two separated cards. Positioning of the carriage to select a group of cards from the deck and selection of the proper fingers to engage the proper card tabs within the group of cards is controlled automatically from input addressing information to the storage unit. Likewise, the position of the transducer can be varied according to input information to scan across any selected one of a plurality of parallel channels on the selected card.

For a more complete understanding of the invention, reference should be made to the accompanying drawings, wherein.

Figure 1:
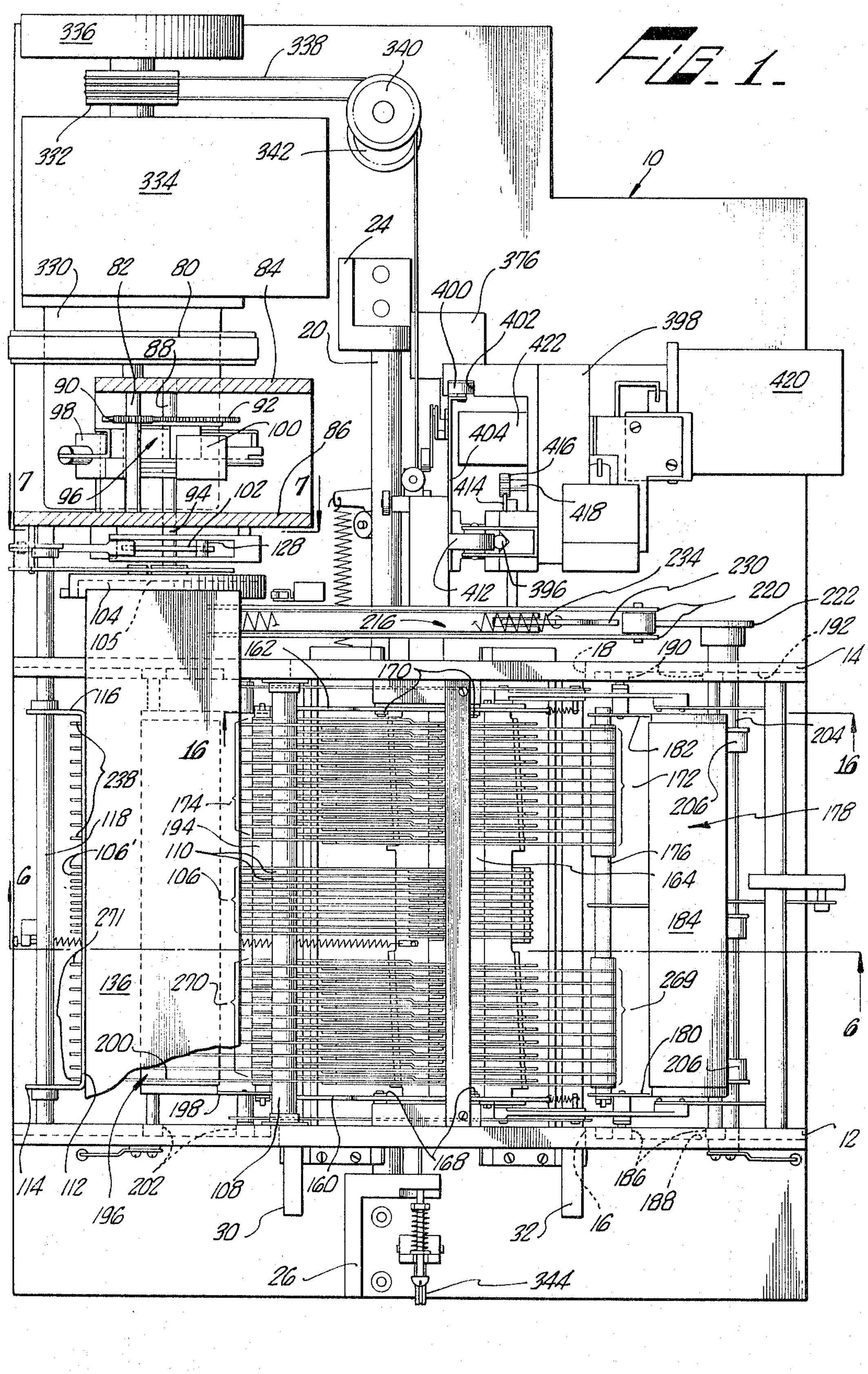
FIGURE 1 is a top view of a preferred embodiment of the present invention.
Figure 2:
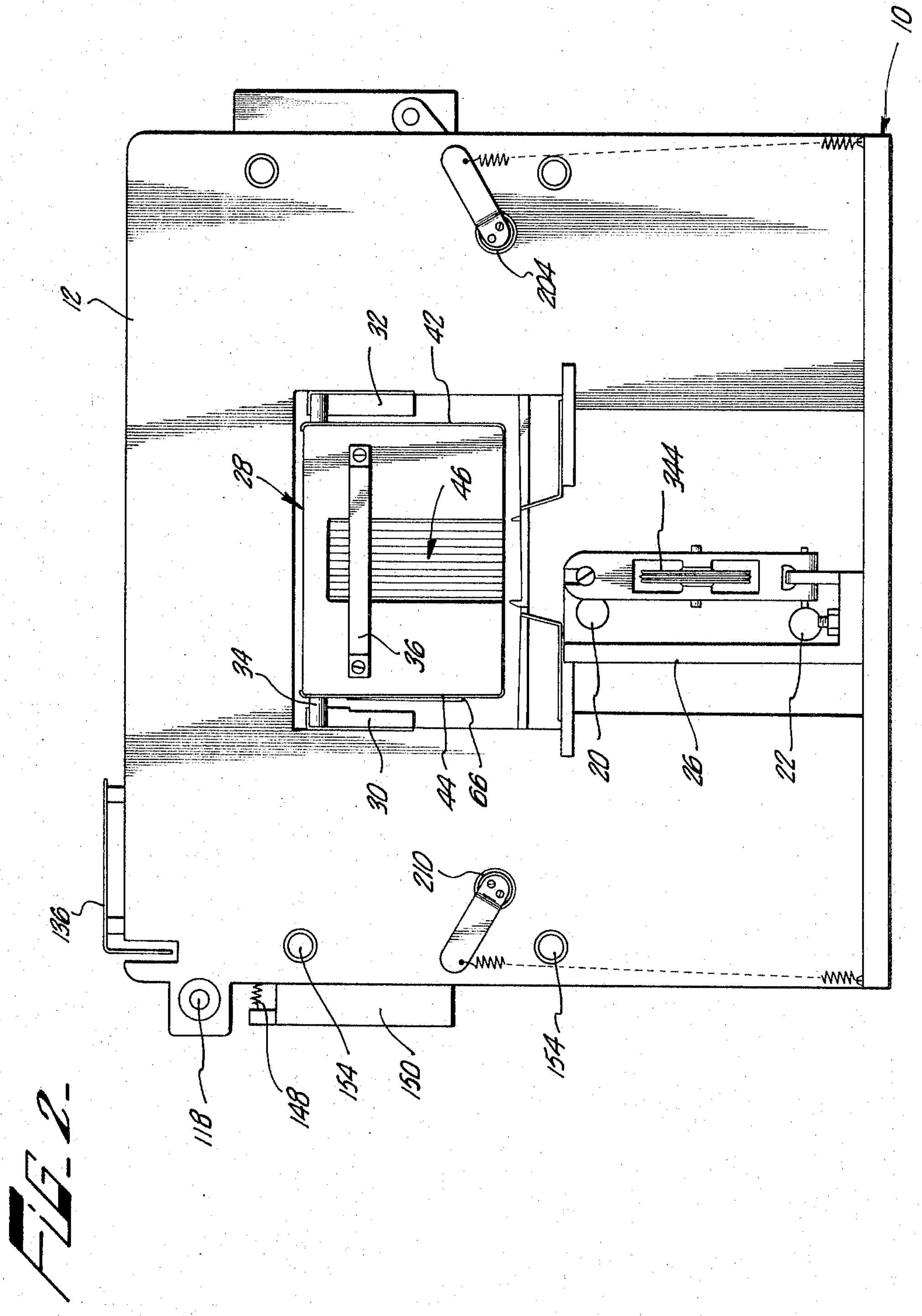
FIGURE 2 is a front elevational view of the apparatus of FIGURE 1.
Figure 6:
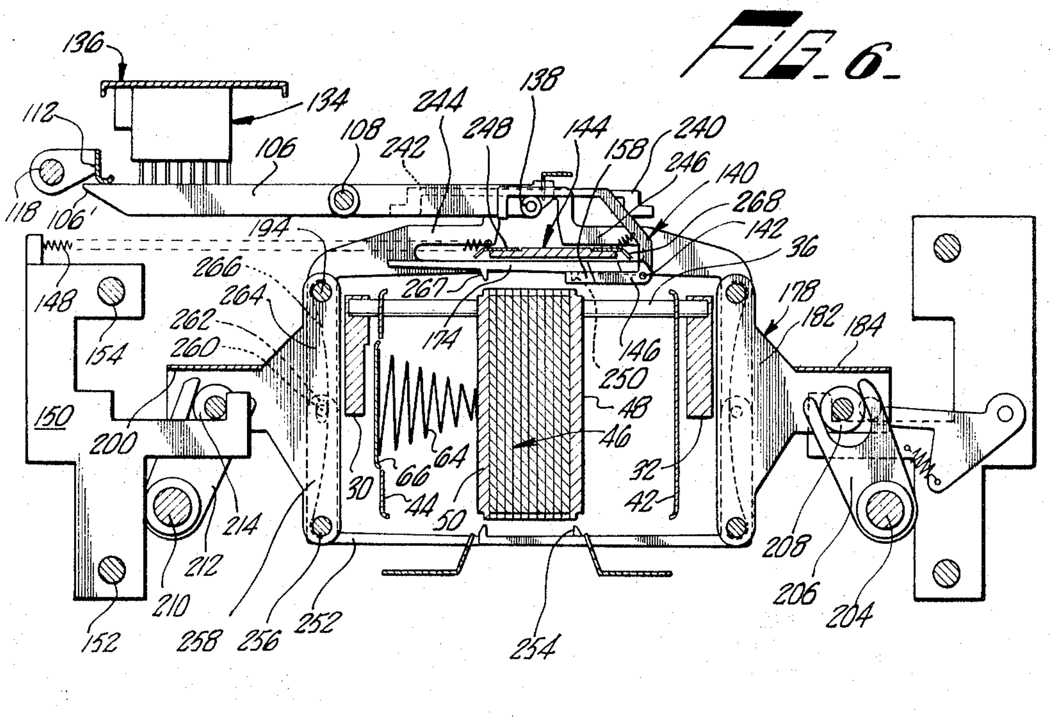
FIGURE 6 is a partial sectional view taken on the lines 6—6 of FIGURE 1.
Figure 7:
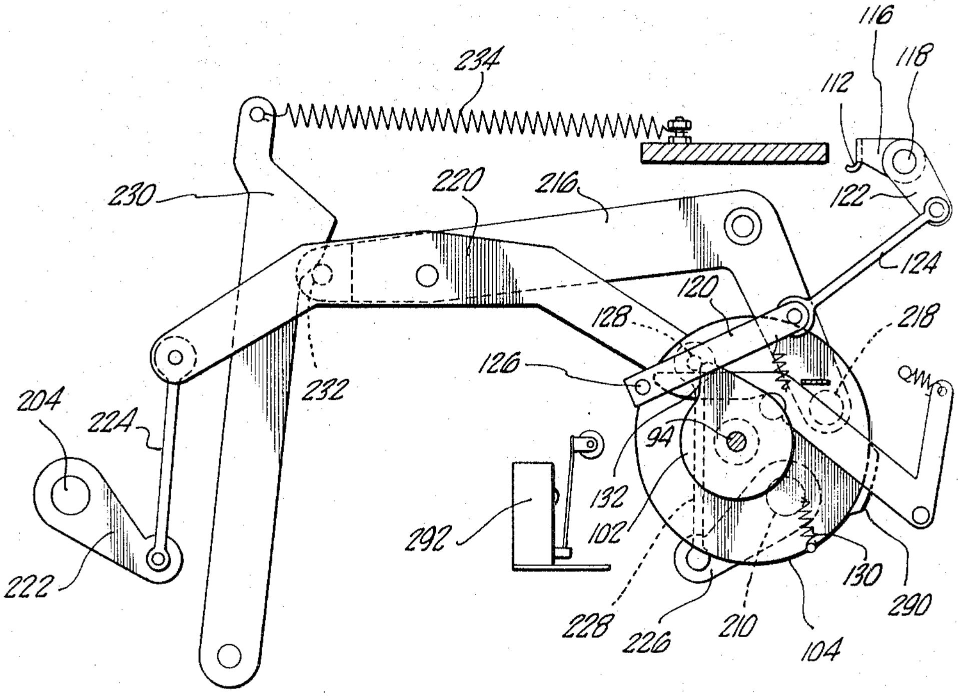
FIGURE 7 is a partial sectional view taken on the lines 7—7 of FIGURE 1.
Figure 12:
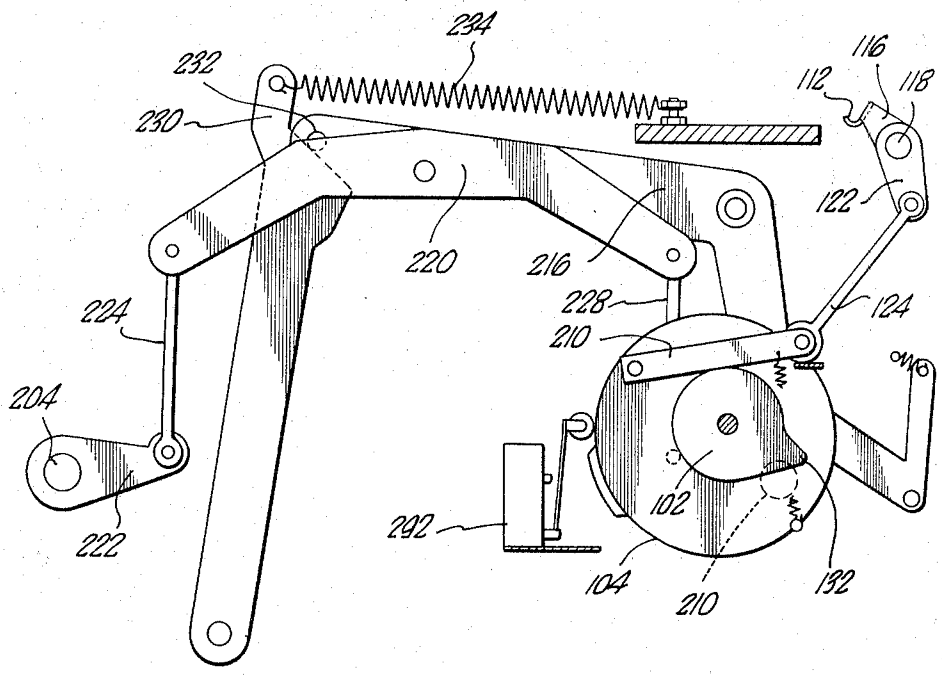
Figure 13:
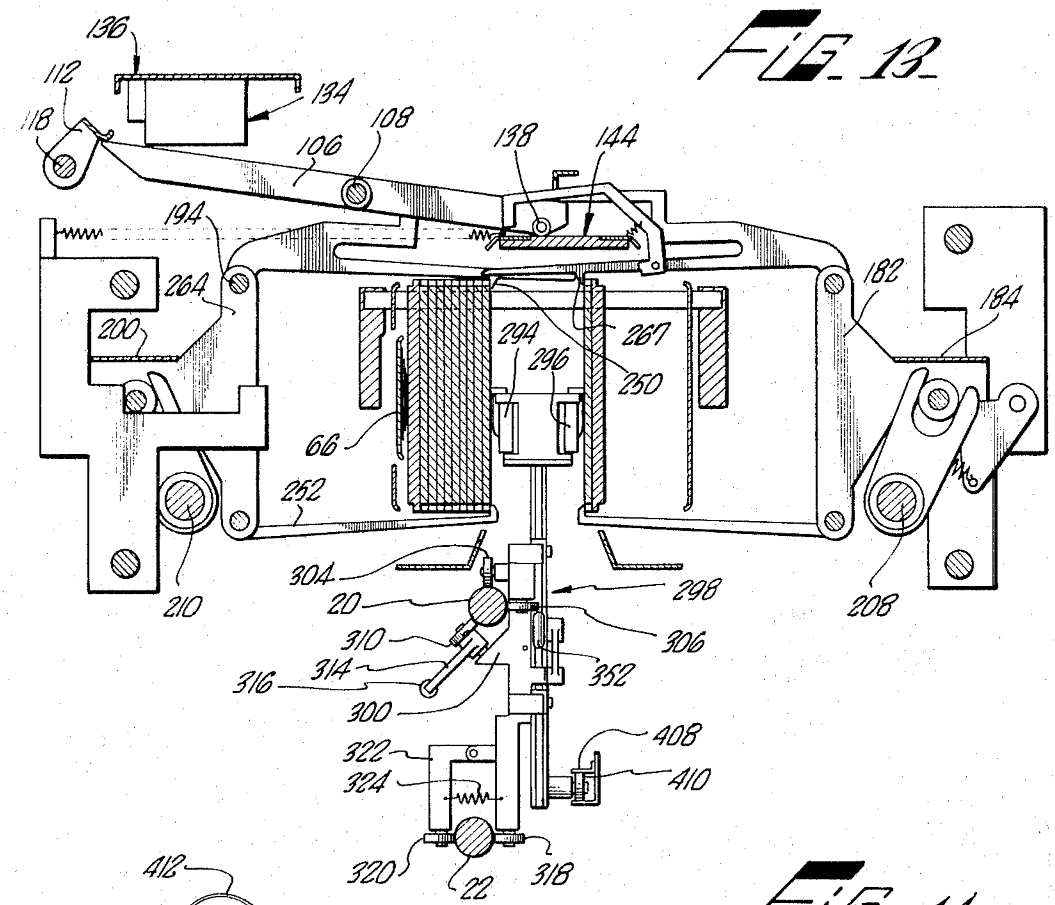
Figure 14:
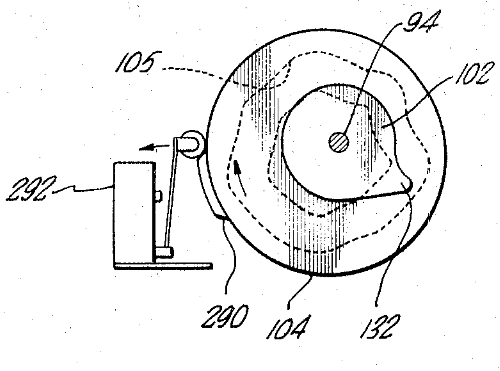
Figure 15:
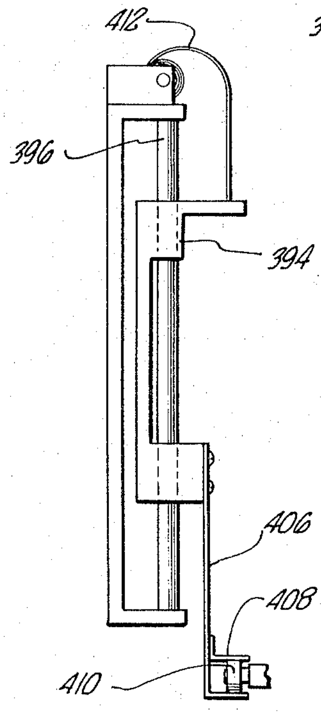
Figure 20:
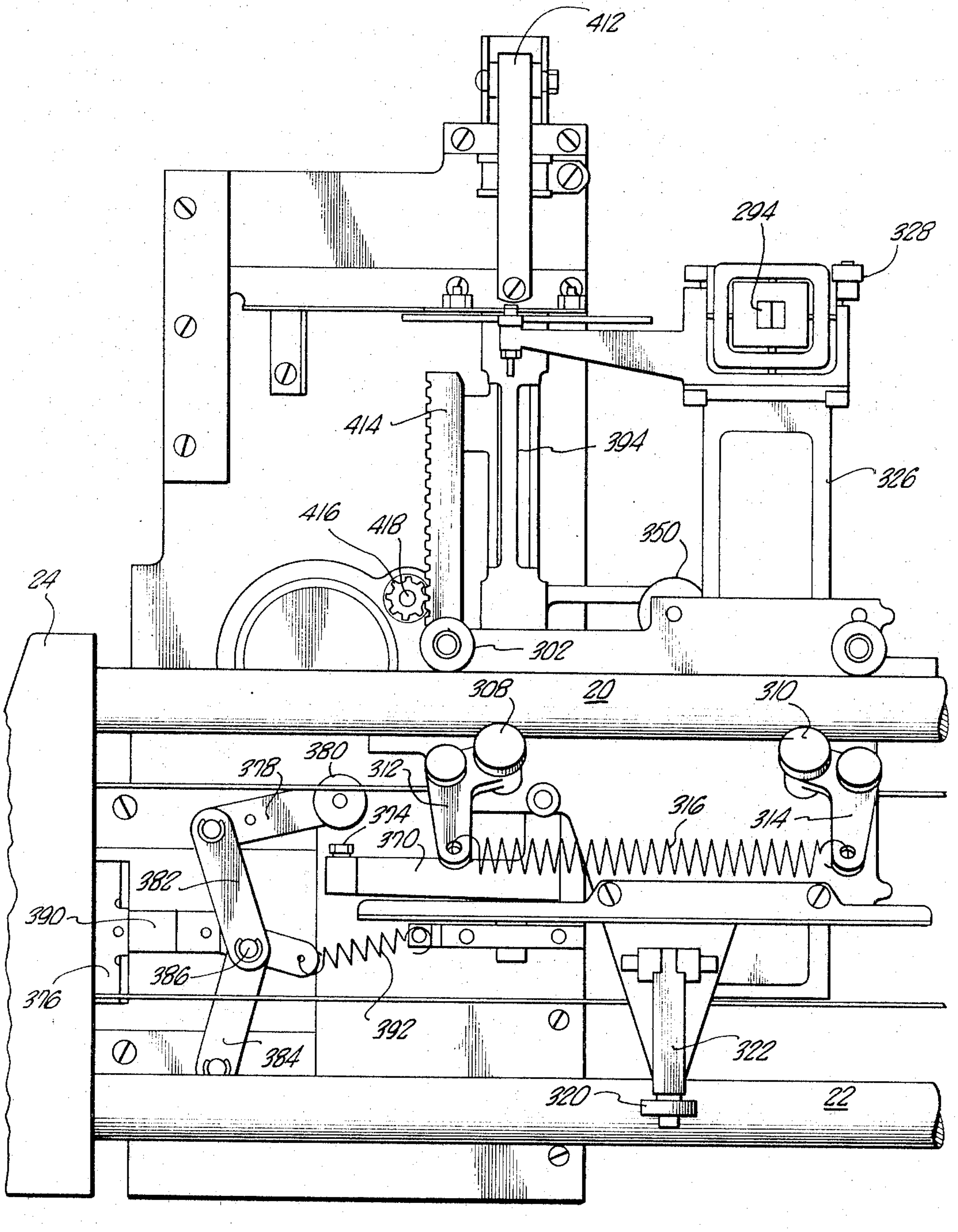
Figure 21:
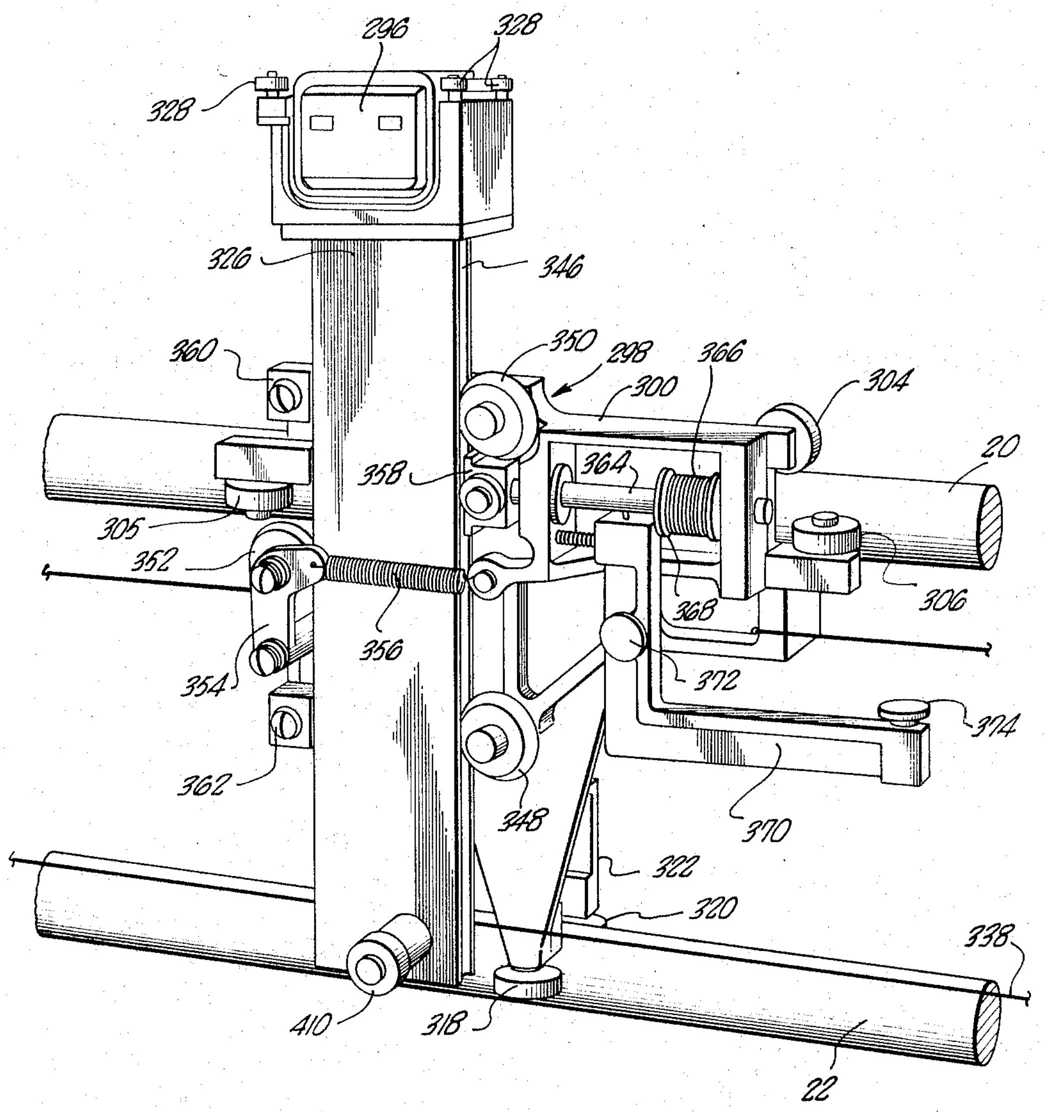
Figure 22:
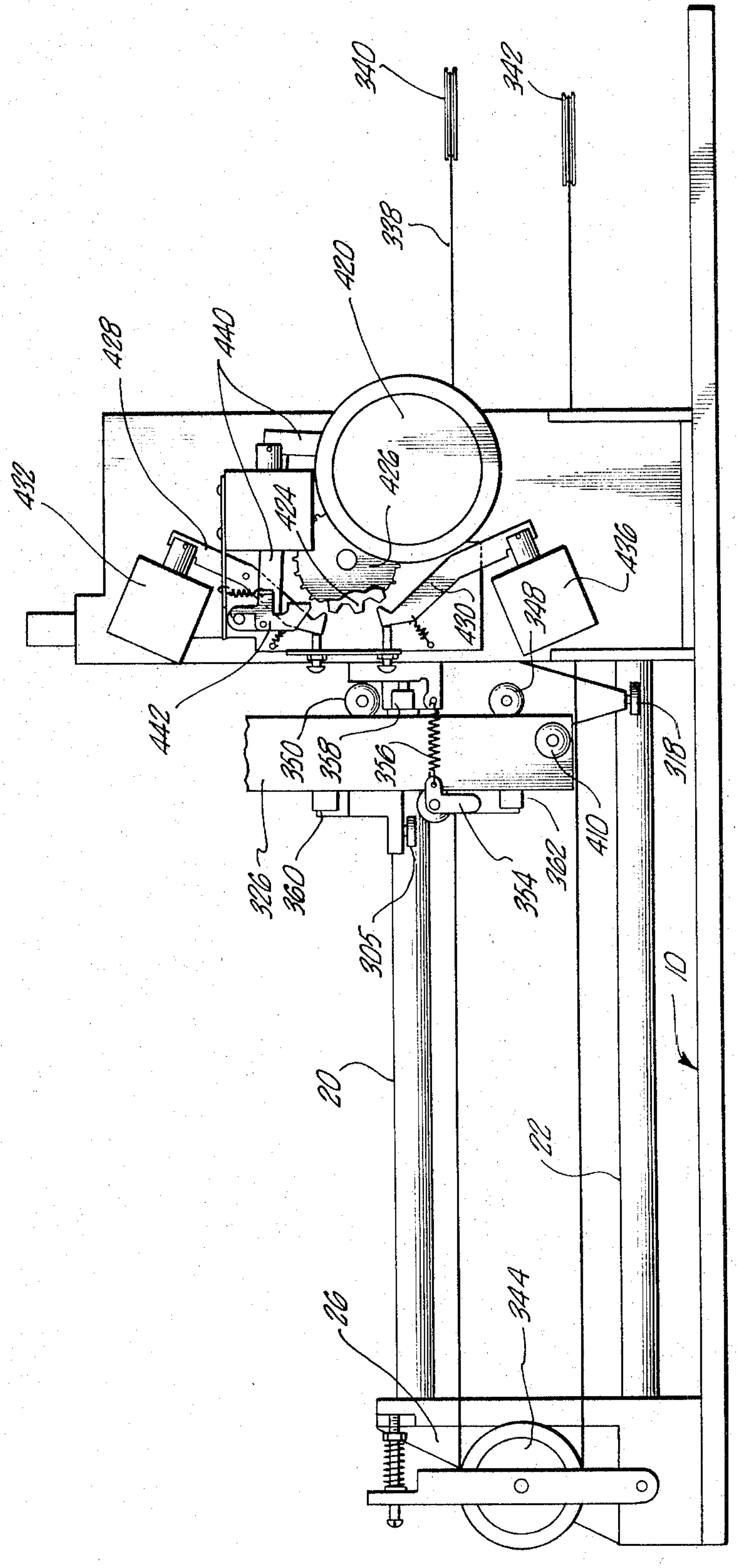
Figure 23:
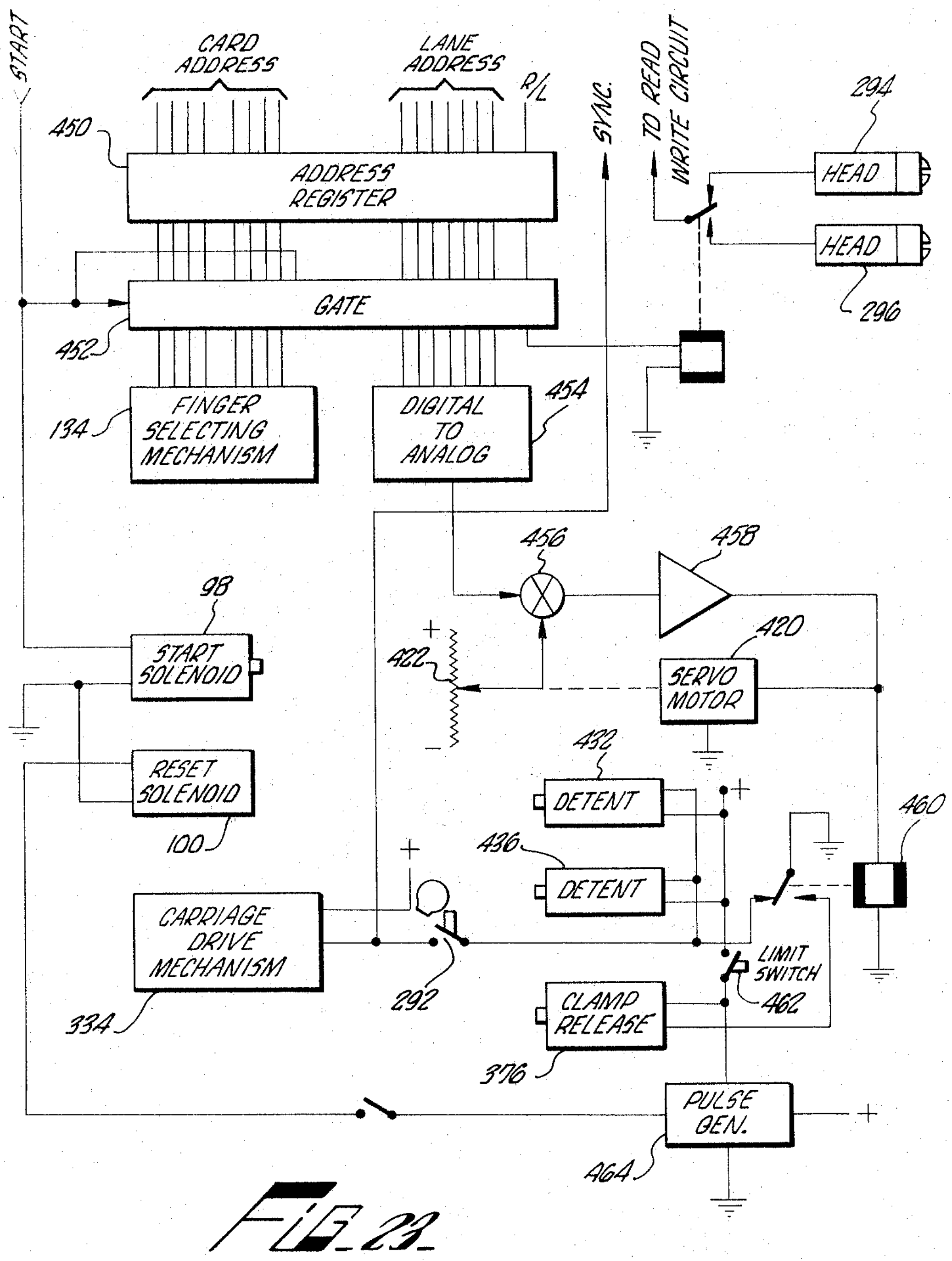

FIGURES 9, 10, 11, and 12 are the same views as FIGURES 6 and 7 but with the mechanism advanced through various stages of operation;

FIGURE 13 is similar to the view of FIGURE 6 but showing the deck separated and showing the transducer mechanism for scanning the separated cards;

FIGURE 14 is a partial view showing the cam mechanism passed beyond the position in which it is shown in FIGURE 12;

FIGURE 15 is a partial view showing the transducer positioning mechanism;

FIGURES 16 through 19 are partial sectional views taken substantially along the lines 16—16 of FIGURE 1 and showing the mechanism for positioning the fingers in relation to the cards in various positions of operation;

FIGURE 20 is an enlarged view showing the positioning and driving mechanism for the scanning transducer;

FIGURE 21 is a perspective view of the transducer carriage;

FIGURE 22 is a partial view showing the locking gear for the positioning mechanism; and FIGURE 23 is a schematic wiring diagram of the control circuit.

Referring to the drawings in detail and to FIGURES 1 and 2 in particular, the numeral 10 indicates generally a base plate of the card selecting apparatus to which are rigidly secured a front frame plate 12 and a back frame plate 14. The front and back frame plates are provided with large central openings extending upwardly from the base plate 10 to substantially the top of the frame plates. Through the lower portion of the openings in the frame plates 12 and 14 extend a pair of parallel guide rods 20 and 22. The guide rods are supported from the base plate 10 by a pair of support brackets 24 and 26, the guide rods being supported parallel to the base plate 10 with the guide rod 20 positioned above the guide rod 22. The guide rods are used to guide a scanning transducer assembly which moves along the guide rods in a horizontal direction so as to pass back and forth between the front and back frame plates 12 and 14, as will hereinafter be described in detail.

The upper portion of the opening 16 in the front plate 12 permits a magazine for loading a card deck into the card selecting apparatus to be inserted in the machine in position above the transducer guide bars 20 and 22 within the space between the front and back plates 12 and 14. The card deck magazine, indicated generally at 28, is inserted through the upper portion of the front plate 16 on a pair of guide tracks 30 and 32 which extend between and are supported by the frame plates 12 and 14 within the openings 16 and 18. The tracks 30 and 32 are provided with grooves which are engaged by guide pins 34 projecting from the sides of the magazine 28. Thus the magazine 28 can be placed in position or withdrawn from the card selecting apparatus as though it were a conventional file drawer. A handle 36 on the front of the magazine facilitates the easy removal of the magazine.

Figure 3:
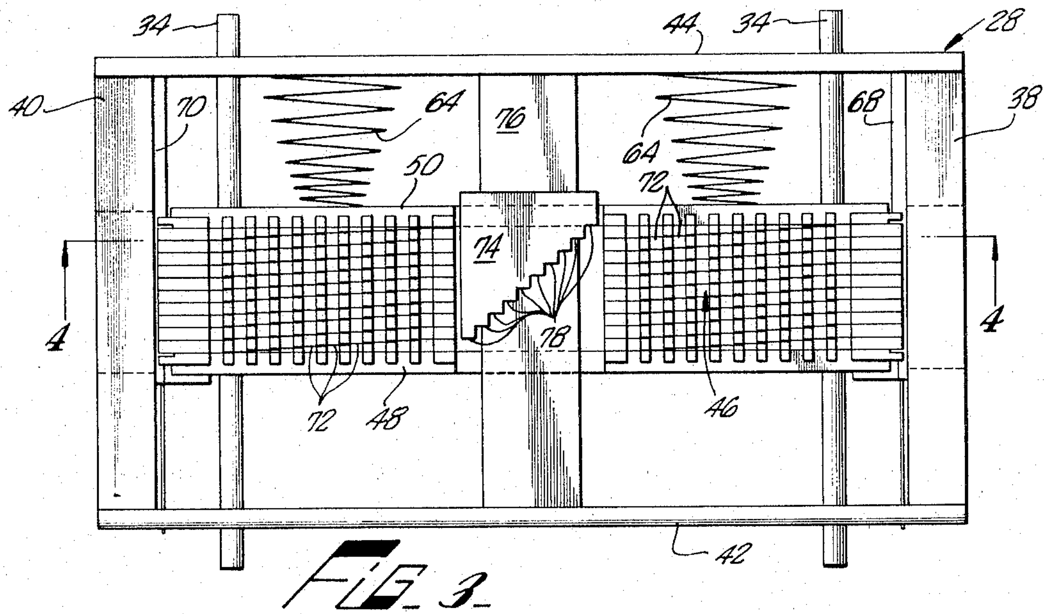
FIGURE 3 is a top view of the removable card deck cartridge.
Figure 4:
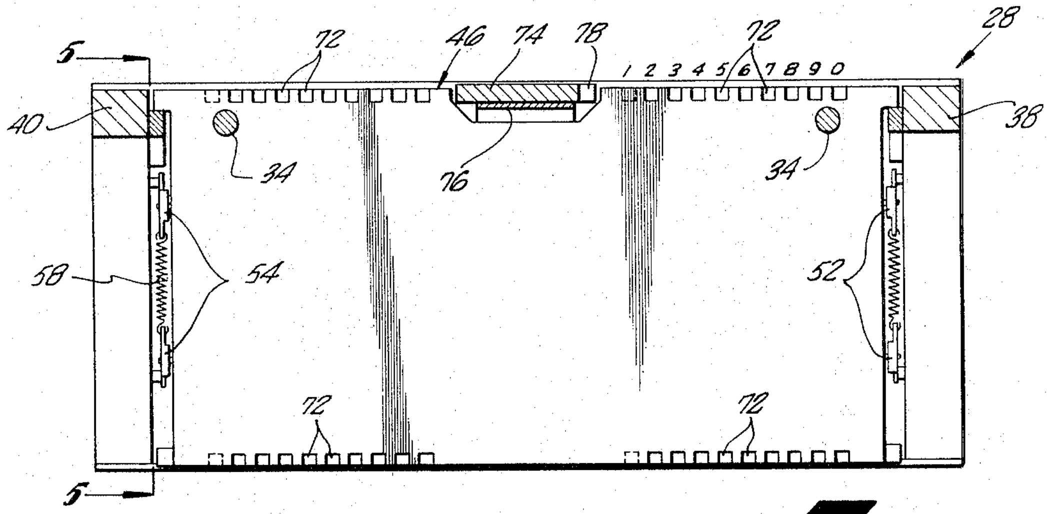
FIGURE 4 is a sectional view of the cartridge taken on the lines 4—4 of FIGURE 3.
Figure 5:
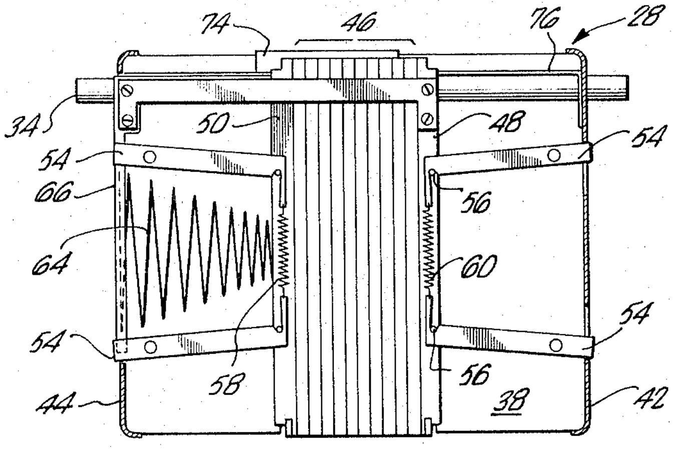
FIGURE 5 is a sectional view taken on the lines 5—5 of FIGURE 4.

The details of the card magazine are shown in FIGURES 3, 4, and 5. The frame of the magazine consists of two end plates 38 and 40 and a pair of side plates 42 and 44. The deck of cards, indicated generally at 46, is positioned between the side plates 42 and 44 and is supported on the guide pins 34 which extend through aligned holes in the cards. The cards may be in the form of stiff paper or thin metal sheets which are held together in a deck of one hundred cards, for example, the deck being held between two movable clamping plates 48 and 50.

The deck of cards is normally held in a fixed location roughly half way between the two side plates 42 and 44 by two groups of four fingers, the two groups being indicated at 52 and 54 and being located at opposite ends of the magazine. As best seen in FIGURE 5, the four fingers of the group 52 are pivotally supported by the inner surface of the end frame 38 and are provided with notches which engage pins 56 in the adjacent edges of the clamping plates 48 and 50. Tension springs 58 and 60 cause the pins 56 to engage the notches in the fingers 54, thus holding the clamping plates 48 and 50 in a central position for clamping the deck of cards. The notches in the fingers 52 and 54 are tapered slightly so that a lateral force tending to separate the deck of cards causes the fingers to wedge apart against the tension of the springs 58 and 60, permitting the clamping plates 48 and 50 to be moved apart.

The clamping plates 48 and 50 are normally urged towards each other so as to clamp the deck of cards therebetween by means of a pair of compression springs 64. One end of the compression springs 64 engage the back of the clamping plate 50. The other end of the compression springs engage a plate 66 which is supported from the clamping plate 48 by a pair of bracket members 68 and 70. The bracket members 68 and 70 cause the plate 66 to move to the right against the action of the compression springs 64 if separation of the cards in the deck causes the clamping plate 48 to be displaced to the right.

Each of the cards, as shown in FIGURE 4, is provided with four groups of notches, the groups being located at the upper left and upper right hand margins and the lower left and lower right hand margins of each card. There is an identical pattern of nine notches out of ten possible notch positions in each group. In the cards shown in FIGURE 4, the left hand or first notch, as numbered from left to right, is missing. In each successive one of the next ten cards the next notch in succession is missing. This pattern of notches is repeated for each of the ten groups of ten cards forming the hundred cards in the pack. Thus, as best seen in FIGURE 3, each group of notches forms a corresponding group of parallel channels in the margin of the deck of cards, each channel being bridged by every tenth card in the deck. The bridging portion of the card is of course formed by the fact that the particular card is not notched at that point. The lack of a notch will hereinafter be referred to as a tab. Such tabs are indicated at 72. These tabs form a means, as will hereinafter be described, by which individual cards can be selectively engaged and laterally displaced to separate the deck and expose the opposing surfaces of two adjacent cards within the deck.

The card magazine is provided with an indexing block 74 supported above the deck on a support bracket 76 that extends between and is secured to the side plates 42 and 44. The indexing block 74 is provided with a series of steps which form ten surfaces, as indicated at 78, that are parallel to the surfaces of the cards. These ten surfaces are displaced from each other by a distance equal to the thickness of ten of the cards and are used to provide a series of indexing stops for locating a decade selector mechanism, to be hereinafter described, in any one of ten positions corresponding to the ten groups of ten cards each into which the deck is divided. Thus, as will hereinafter be more apparent, the index block 74 provides a means of selecting one of the ten groups of cards within the deck and the tabs 72 provide a means of selecting one card within the ten cards of the group.

With the card magazine inserted in position on the tracks 30 and 32, separation of the deck between any two selected cards is carried out automatically from electrically coded input signals. The mechanism to mechanically select and separate the deck between particular cards is driven from an electric motor (not shown) which, through a belt drive or similar means, rotates a drive pulley 80 carried on a drive shaft 82. (See FIGURE 1.) The shaft 82 is journalled in a pair of bearing plates 84 and 86 which are secured to or supported from the base plate 10 in any suitable manner. The shaft 82 drives a shaft 88 through a pair of reduction gears 90 and 92 carried respectively on the shafts 82 and 88. The shaft 88 is coupled to a coaxial output shaft 94 through a solenoid-operated clutch mechanism indicated generally at 96. The clutch mechanism is operated by two solenoids 98 and 100. The clutch mechanism is arranged such that when the solenoid 98 is momentarily energized, the clutch 96 drives the output shaft 94 substantially through one half turn and when the solenoid 100 is momentarily actuated, the clutch causes the output shaft 94 to be returned to its initial angular position. Clutch mechanisms capable of performing this function are well known in the art and further description of the clutch itself is not believed necessary to the understanding of the present invention.

The output shaft 94 rotates two cams, indicated at 102 and 104. The cam 104 controls and drives the mechanism for separating the deck of cards at the selected point. The cam 102 controls a release mechanism associated with the decoding mechanism by which a particular card is selected in response to electrical input signals identifying an address. The manner of the operation of these cams will become more apparent as the description proceeds.

The selection mechanism involves, first, the selection of one of the ten groups of cards, and, second, the selection of one card of the ten cards in the group. The group selection means includes ten selection control arms indicated at 106. The ten arms 106 are all centrally pivoted on a support shaft 108 which extends between the frame plates 12 and 14. The arms 106 are spaced from each other along the support shaft 108 by suitable spacers, such as indicated at 110. The left hand ends of the arms 106, as indicated at 106', pass under a selector arm release bar 112. The release bar 112 is moved up and down by integral arms 114 and 116 at either end, the arms being secured to a shaft 118 journalled in the frame plates 12 and 14. In standby operating condition, the release bar 112 is in position to hold the selector arms 106 in a released position, i.e., with the right hand end, as viewed in the drawings, in a raised position.

Figure 10:
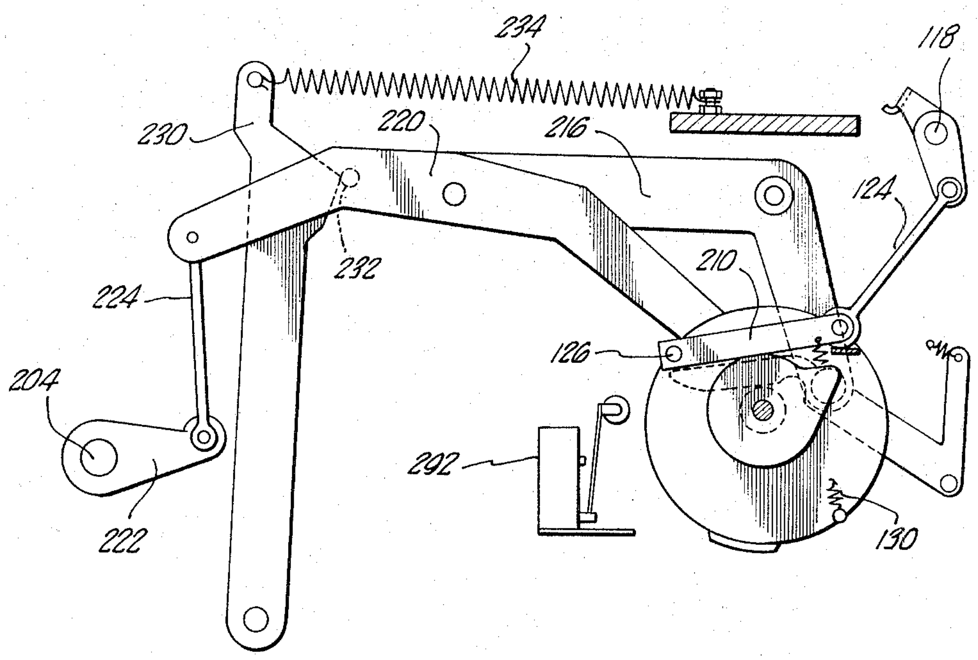

The release bar 112 is controlled by the cam 102. Operation of the release bar 112 can best be understood by reference to FIGURES 7 and 10. FIGURE 7 shows the cam drive 102 in its standby position. FIGURE 10 shows the position of the cam 102 after the shaft 94 has rotated through approximately the first quarter of a turn.

Referring to FIGURE 7 in detail, it will be seen that the shaft 118 which operates the release bar 112 is coupled to a cam follower arm 120 through a linkage including a crank arm 122 secured to the end of the shaft 118 and a connector link 124 pivotally secured at each end respectively to the crank arm 122 and the cam follower arm 120. The cam follower 120 is pivotally secured at its lower end to the bearing place 86 by pivot support shaft 126.

The cam follower arm 120 is provided with a cam engaging pin 128, as best seen in FIGURE 1. A tension spring 130 is anchored at one end to the bearing plate 86 and at the other end to the cam follower arm 120, the spring urging the cam follower pin 128 into contact with the cam 102. It will be seen that when the cam 102 is in its initial condition, the cam follower pin 128 rides up on a lobe 132, causing the crank arm 122 to be pushed as far to the right as possible as viewed in FIGURE 7. With clockwise rotation of the cam 102 to the position shown in FIGURE 10, the spring 130 pulls the cam follower arm 120 downwardly as the pin 128 rides down off the lobe 132. This causes the crank arm 122 to move to the left producing clockwise rotation of the shaft 118, lifting the release bar 112 away from the selector arms 106.

Referring to FIGURE 6, the mechanism for selecting a particular card group is shown in its stand-by or initial operating condition. The release bar 112 is holding all ten of the selector arms 106 in a down position at their left hand end 106'. A solenoid-operated selector mechanism, indicated generally at 134, is positioned above the selector arms 106 and is supported beneath a support bracket 136 extending between the front and back frame plates 12 and 14. The selector mechanism 134 may be of any suitable type by which all but a selected one of the arms 106 is engaged and prevented from moving when the release bar 112 is lifted. The particular form of the selector mechanism 134 is not material to the present invention but may comprise any suitable electrically operated stop means which can be controlled to release any one of the selected ten arms 106 in response to an electrical input signal.

Figure 8:
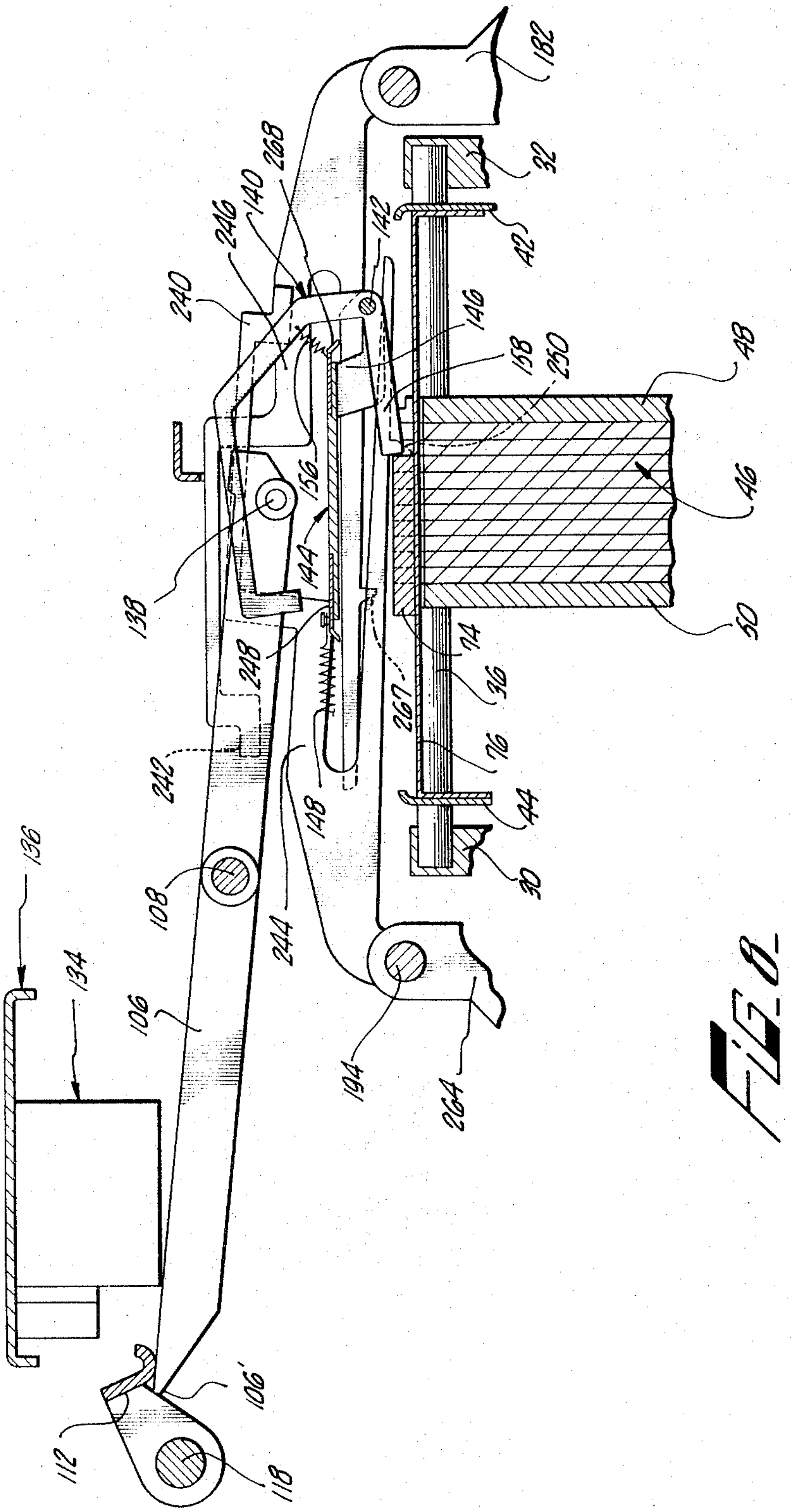
FIGURE 8 is an enlarged view of the card selection mechanism of FIGURE 6.
Figure 9:
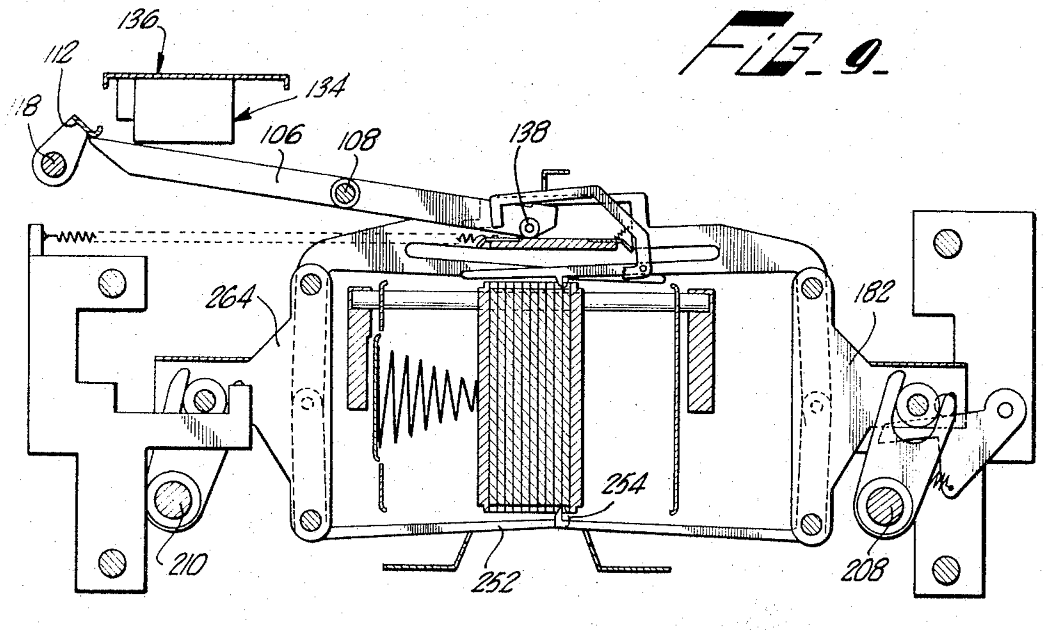

When the release bar 112 is lifted, the selected one of the release arms 106 is permitted to pivot, as shown in FIGURE 8. The right hand end of each arm 106 is provided with a roller 138 against which a pivoted stop arm, indicated generally at 140, rests. It should be understood that there are ten such pivoted stop arms 140, there being one associated with each of the ten selector arms 106. The stop arms 140 are pivotally supported by a pin 142, the pin being secured to a carriage assembly, a portion of which is indicated at 144, by suitable brackets 146. The carriage assembly 144 is movable in a horizontal plane above the card magazine and is normally urged to the left by a tension spring 148, the spring 148 being anchored to a frame member 150. As best shown in FIGURE 1, the frame member 150 is located between the front frame plate 12 and the back frame plate 14. Suitable support rods, such as indicated at 152 and 154 in FIGURE 5, provide support for the frame member 150.

As best shown in FIGURE 8, when a particular selector arm 106 is actuated by the raising of the release bar 112, the associated roller 138 is lowered, permitting the stop arm to pivot in a counter clockwise direction about its pivot pin 142. Tension springs, indicated at 156, are connected between the carriage assembly 144 and each of the stop arms to bias the stop arms against the rollers 138.

When the end 106' of one of the arms 106 is released, the associated spring 156 causes the associated stop arm 140 to drop a lower portion 158 thereof into position to engage the indexing stop element 74 mounted on the card magazine. Each one of the stop arms 140 is in position to engage one of the stop surfaces 78 on the indexing element 74. Thus the carriage assembly 144, when it is permitted to move to the left, is caused to stop in any one of ten positions depending upon which stop arm 140 has been permitted to rotate into a stop position by the operation of a selected one of the selector arms 106.

The carriage assembly 144 includes a pair of guiding and support members 160 and 162. See FIGURE 1. These support members are joined by a bridge member 164 which extends above the card magazine. The support members 160 and 162 have elongated slots therein, as indicated at 166 in the sectional view of FIGURE 16. A pair of spaced guide rollers 168 supported from the front frame plate 112 engage the slot in the supporting member 160. A similar pair of rollers 170, supported from the back frame plate 14, engage the slot 166 in the side plate 162.

Once the carriage assembly 144 is positioned in one of the ten possible positions, actual separation of the card deck is accomplished by groups of fingers which are arranged to engage the tabs 72 on the margins of the selected card. For this purpose there are two groups of such fingers which are arranged to be moved apart, the fingers in the two groups engaging the tabs on two adjacent cards to move the cards apart. Each of the two groups of fingers are arranged in two sections located on either side of the group of ten stop arms 140, as seen in FIGURE 1. As best seen in FIGURE 6, the fingers in a particular group and section are further arranged with upper and lower fingers. Thus the fingers in each of the two groups are positioned to engage a particular card at four places, corresponding to the four groups of notches and tabs on the margins of each card.

Considering first the section of fingers between the stop arms 140 and the back frame plate 14, as shown in the sectional views of FIGURES 6, 8, 9, and 11, there are ten upper right hand fingers, such as indicated at 172, and ten upper left hand fingers, such as indicated at 174. The upper right hand fingers 172 are pivotally supported on a rod 176. The rod 176 is part of a right hand movable finger supporting assembly indicated generally at 178. The right hand finger supporting assembly includes a pair of end brackets 180 and 182 which are secured together by a bridging frame 184 as well as the rod 176. The end bracket 180 is supported by a pair of rollers 186 which engage a groove 188 in the inside surface of the front frame member 12. The end bracket 182 is similarly supported by a pair of rollers 190 which engage a groove 192 in the inside surface of the back frame member 14.

The upper left hand fingers 174 are similarly pivoted on a rod 194 which is part of a left hand movable finger supporting assembly, indicated generally at 196, which is similar to the assembly 178. Thus the left hand movable assembly includes a pair of end brackets, one of which is shown at 198 in FIGURE 1, joined by a bridging frame member 200 as well as the rod 194. The assembly is movably supported on rollers 202 supported from the end frame member 198 and engaging a horizontal groove in the front frame plate 12. Similar rollers support the other end of the assembly from the back frame plate 14.

The manner in which the movable assemblies 178 and 196 are driven apart during the operation in which the deck is separated is best seen by reference to FIGURES 5 and 6. Movement is imparted to the right hand movable assembly 178 by rotation of a shaft 204 extending between and journalled in the front and back frame plates 12 and 14. A pair of crank arms 206 are each in the form of a clevis which engages a roller 208. The rollers 208 are respectively mounted on the inside of the end brackets 180 and 182. Thus rotation of the shaft 204 imparts a lateral movement to the movable assembly 178.

Similarly, a shaft 210 is provided with crank arms 212 which engage rollers 214 secured to the end brackets of the movable assembly 196.

The shafts 204 and 210 extend through the back plate 14 and are rotated by a linkage mechanism as shown in FIGURE 7 from the cam 104. One face of the cam 104 is provided with a groove 105. A cam follower arm 216 is pivotally supported on the back frame plate 14. One end of the cam follower arm 216 is provided with a roller 218 which engages the groove 105 in the surface of the cam 104. The other end of the cam follower arm 216 is pivotally joined to a beam 220, one end of which is connected to a crank arm 222 secured to the end of the shaft 204 through a link 224. The other end of the beam 220 is similarly joined to a crank arm 226 on the end of the shaft 210 through a link 228. As the cam 104 is rotated by the drive shaft 94, the cam follower arm 216 acts to raise the center of the beam 220 thus pulling up on the links 224 and 228 and causing opposite rotation of the shafts 204 and 210. The beam arrangement permits differential rotation of the two shafts, which is important to the operation because the combined movement of the two halves of the card deck at the completion of the card separation must be a fixed amount, but the movement of either portion of the card deck may vary depending upon the relative thickness of the two parts of the deck when separated. This will become more apparent as the description proceeds. A cam loading arm 230 may be provided which is pivotally supported from the back plate 14. The cam loading arm 230 bears against a pin 232 secured to the cam follower arm 216 under the influence of a tension spring 234.

It should be recalled that the carriage assembly 144 is normally urged to the left, as viewed in the various figures, under the influence of the tension spring 148. In the initial stand-by operating position, the carriage 144 is restrained from moving to the left by a stop portion 236 integral with the support bracket 162 of the carriage assembly 144. See FIGURE 16. A similar stop portion is provided by the support bracket 160. The portion 236 extends into position to engage the shaft 194 which is a part of the movable finger supporting assembly 196. When the solenoid 98 associated with the clutch 96 is actuated at the beginning of a card selection operation, rotation of the cam 94 causes the cam follower arm 216 to lift the beam 220, tending to rotate the shafts 204 and 210 through the respective linkages 224 and 228. See FIGURE 7. Because the carriage assembly 144 through the urging of spring 148 pushes against the movable assembly 196 through the stop portion 236, the movable assembly 196 moves initially to the left while the movable assembly 178 remains stationary. As the movable assembly 196 and the carriage assembly 144 move together to the left, a point is reached, depending upon which of the ten selector arms 106 has been operated by the selector mechanism 134, where the portion 158 of one of the stop arms 140 engages the indexing block 74. The carriage assembly 144 then halts in the selected one of the ten possible positions, corresponding to the relative position of a selected one of the ten groups of cards of the deck in the magazine.

The function of the carriage assembly 144 is to cause the selected ones of the fingers 172 and 174 to engage the tabs on particular cards within a selected group of cards. This is accomplished in the following manner. A group of selector arms 238, identical in form to the selector arms 106, are pivotally mounted on the shaft 108. Suitable selector means, similar to the selector means 134, permits one of the ten selector arms 238 to pivot when the release bar 112 is moved out of position at the beginning of an operating cycle. This permits an associated pair of the fingers 172 and 174 to pivot. The fingers 172 each include a portion 240 which rides above a roller on one side of the associated selector arm 238, while each of the fingers 174 includes a portion 242 which rides on a roller on the other side of the associated selector arm 238. Each finger 172 further includes a stop rest portion 244 which comes into engagement with the top surface of the bridging member 164 of the carriage assembly 144. Each of the fingers 174 is similarly provided with a stop rest portion 246. When a particular selector arm 238 is released, the two associated fingers 172 and 174 pivot until the stop rest portions come into engagement with the top surface of the bridge portion of the carriage assembly 144.

As the movable assembly 196 continues to move to the left, as viewed in FIGURE 6, when the carriage assembly 144 comes to rest at the selected position determined by the indexing mechanism described above, the fingers 172 move relative to the carriage assembly. As as result, the stop rest portion 244 of the selected finger 172 begins to slide toward the marginal edge of the bridge portion of the carriage assembly 144. This marginal edge is in the form of a plate 248 having one edge bevelled downwardly and which, as viewed from above as in FIGURE 1, extends transversely at a slight angle to the normal. This angle corresponds to the angle produced by the line of tabs 72 of adjacent cards in a group of ten cards, as best viewed in FIGURE 3. Thus the position of the carriage assembly 144 and associated plate 248 controls the point in the leftward movement of the fingers 172 at which the stop rest portion 246 slides off the top of the carriage assembly and down the bevelled edge of the plate 248. As the stop rest portion 246 slides down the bevelled edge of the plate 248, the fingers 172 pivot to permit a lug 250 to move down into the space between two tabs in the associated channel formed in the top of the card deck by the marginal notches. The space between two tabs is, of course, equal to the thickness of ten cards. Once the lug 250 drops down into position to engage a tab on a card, further leftward movement of the movable assembly 196 causes the selected card and all cards to the left of the selected card to be forced to the left by the moving finger against the pressure of the compression springs 64 in the magazine assembly.

Each of the fingers 172 has associated therewith a second finger 252 having a lug 254 positioned to engage a tab on the same card but on the lower margin of the card. The lower fingers 252 are pivoted on a shaft 256. The upper and lower fingers work together through a linkage that includes an integral crank arm portion 258 of each finger 252 and a pin 260 at the end of the crank arm which engages a slot 262 in a corresponding crank arm portion 264 of each of the fingers 172. Thus each of the upper fingers 172 operates in unison with one of the lower fingers 252 to engage opposite margins of the same card. A flat spring 266 extending between the shafts 194 and 256 and over the pin 260 urges rotation of the fingers 172 and 252 in a direction to bring the lugs 250 and 254 into engagement with the cards.

The fingers 174 of the second group of fingers, carried by the movable assembly 178, are each provided with a lug 267. As the assembly 178 moves to the right, the stop rest portion 246 slides off a bevelled plate 268, similar to the plate 248. The lug 267 of a finger 174 associated with a particular selector arm 238 engages the tab of the next adjacent card in the deck from the card engaged by the lug of the finger 172 associated with the same selector arm. In other words, the two fingers 172 and 174 operated by a particular selector arm 238 are spaced apart laterally by the distance between adjacent notches on the card margin. In this way, the two fingers engage the tabs of adjacent cards to pull the cards apart.

In order that the cards may be effectively separated, a second section of fingers are arranged on the moving assemblies 178 and 196, as indicated respectively at 269 and 270. This second section of fingers is operated by a group of selector arms indicated at 271. These selector arms are operated in identical fashion to the selector arms 238.

In order that the lugs may not damage the tabs on the cards when they come into engagement, it is desirable that the movable assemblies 178 and 196 be moving relatively slowly at the time the fingers drop into position for the lugs to engage the tabs on the cards. This is controlled by a special interlock arrangement, as best shown in FIGURES 16–19. The interlock mechanism is located on the carriage assembly on each of the end brackets 162 and 160. Only one of the interlocking assemblies is shown in FIGURES 16–19. The interlock mechanism comprises an interlock arm indicated generally at 272. The interlock arm 272 is pivotally supported from the support member 162 of the carriage assembly 144 by a bracket 273 riveted or otherwise secured to the support member 162. A hinge pin 274 permits the interlock arm 272 to pivot. A spring 276 extending between the arm 272 and the support member 162 normally urges the right hand end of the interlock arm 272 in an upward direction and urges the left hand end of the arm against a stop pin 278. The left hand end of the interlock arm 272 is provided with a latch portion 280 which normally drops down behind the shaft 194, restricting the movement of the shaft 194 and the associated movable assembly 196. The end of the shaft 194 is provided with a reduced diameter portion 282 which acts as a catch for the latch 280.

Figures 16, 17, 18, 19:
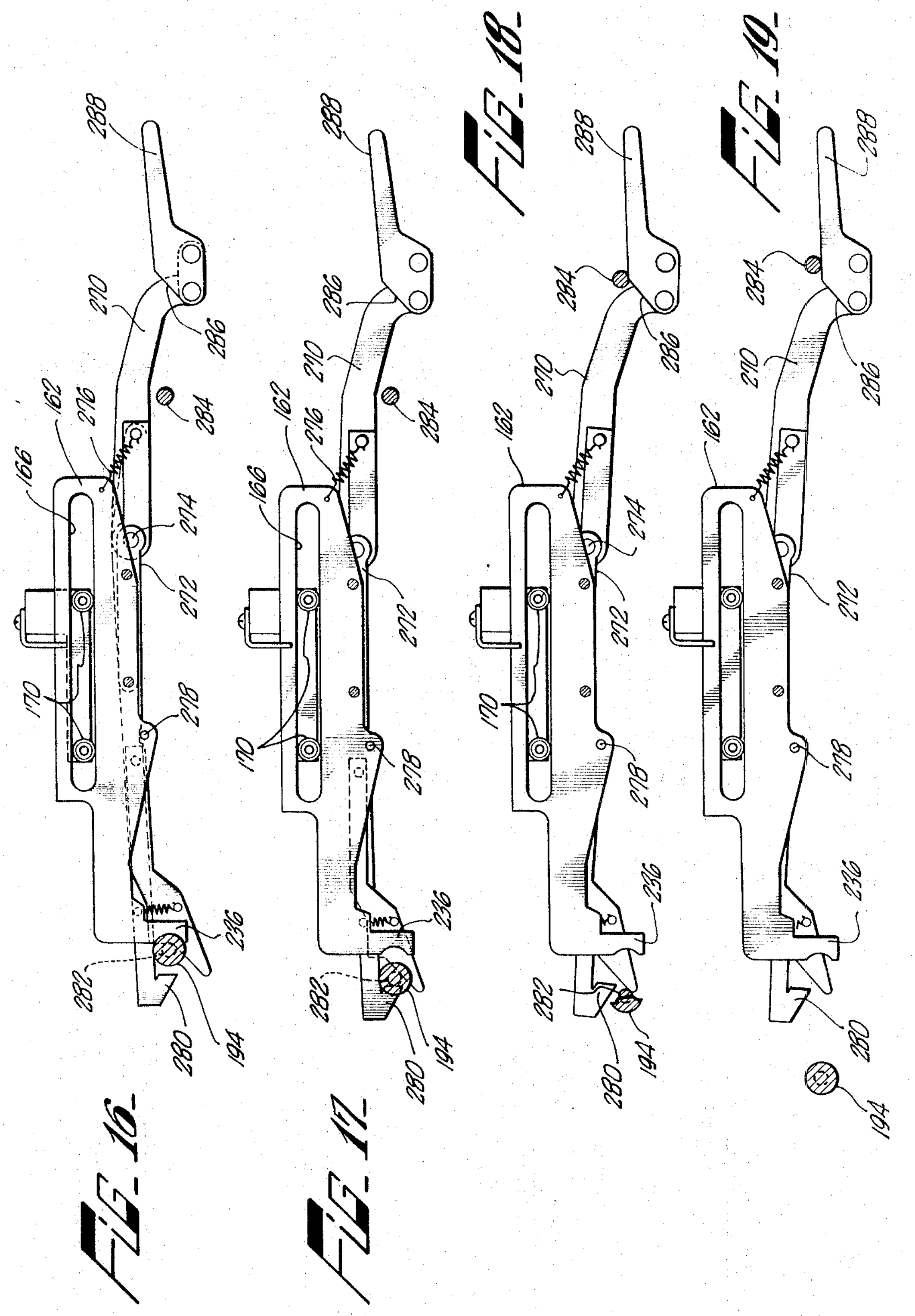

When the movable assembly 196 moves to the position where the end portion 282 of the shaft 194 engages the catch 280, as shown in FIGURE 17, the movable assembly 196 and associated fingers are restrained against further movement to the left. At his point the portion 244 of the selected one of the fingers 174 has not dropped off the edge of the member 248 on the carriage assembly 144. Thus the associated lug 250 of the finger 172 is held slightly above the position of contact with the tab on the selected card in the card pack.

Because the left hand movable finger supporting assembly 196 is restrained by the latch 280, the differential drive linkage provided by the cam follower 216 and beam 220 (see FIGURE 7) produces a motion of the movable assembly 178 to the right. A reduced diameter portion 284 of the shaft 176 moves to the right with the assembly 178, as viewed in FIGURES 16–19. As shown in FIGURE 18, the portion 284 ultimately comes into contact with a cam surface 286 of a cam member 288 secured to the right hand end of the interlock arm 270. The cam surface 286 is wedged in a downward direction by contact with the portion 284 of the shaft 176. This causes the latch 280 at the other end of the interlock arm 270 to be lifted above the portion 282 of the shaft 194, thus permitting the movable finger supporting assembly 196 to move further to the left. The position of the cam member 288 is such that the latch 280 is disengaged at the instant that the portion 246 of the selected finger 174 drops off the edge of the plate 268. This is the condition illustrated in FIGURE 9, which shows the lugs on the fingers having dropped in behind the tabs on the cards. The lugs are now in position to separate the pack at a point between the selected cards.

Figure 11:
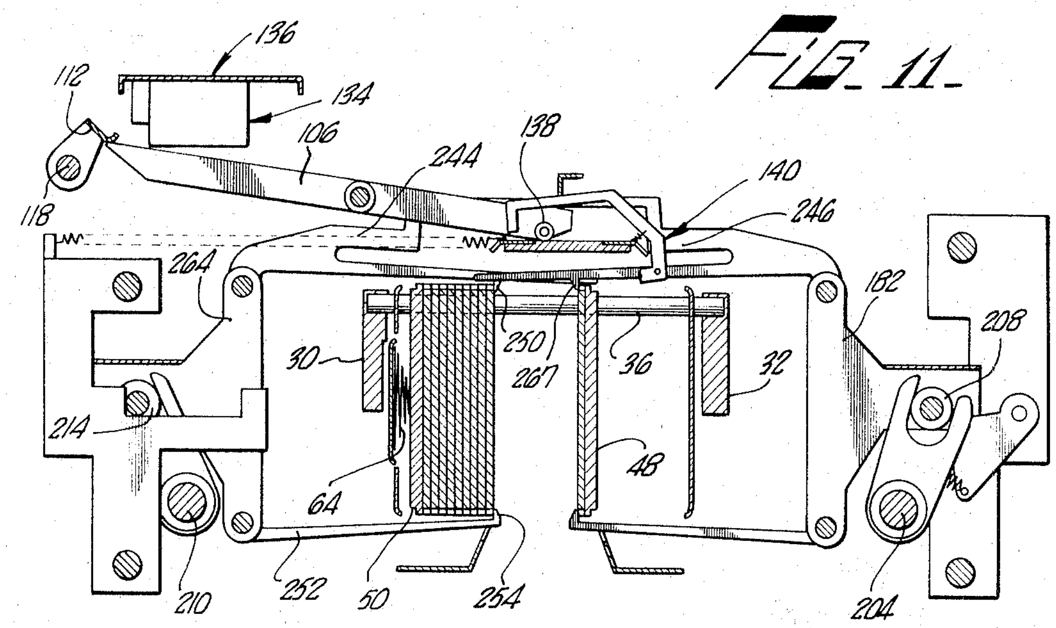

As the cam 104 continues to rotate, the movable assemblies 178 and 196 continue to move apart, spreading the pack until the assemblies move to their extreme positions. The adjacent cards in the separated pack are thus moved apart to two fixed locations which are always the same regardless at what point the deck is cut by the card selecting mechanism. FIGURE 11 shows the condition of the mechanism when the pack is fully separated. FIGURE 12 shows the corresponding condition of the drive cam 104 and associated linkage for operating the movable finger supporting assemblies 178 and 196.

At this point in the operation, the clutch mechanism 96 disengages the cam 104 from the drive shaft 94, but not before the cam 104 is rotated to a position in which a step portion 290 on the outer surface of the cam actuates a switch 292, as shown in FIGURE 14. The switch 292 functions to initiate the operation of a mechanism, to be hereinafter described, by which a transducer is caused to scan between the separated cards of the pack for reading out information or recording information on the surface of the card.

The transducer mechanism and the associated drive and positioning mechanism is described with reference to FIGURES 1, 13, 20, 21, and 22.

With the card pack separated, as shown in FIGURE 13, a pair of transducers 294 and 296 are moved across the opposing surfaces of the separated cards. The transducers are preferably in the form of magnetic heads by which information may be recorded or played back magnetically in the manner of conventional magnetic tape. The transducers 294 and 296 are mounted on a head carriage assembly indicated generally at 298 which is movable along and guided by the parallel guide rods 20 and 22. The carriage assembly includes a carriage frame 300. As best seen in FIGURE 20, the carriage assembly is supported on the guide rod 20 by a pair of ball bearing rollers 302 and 304 which ride on the top surface of the rod 20. A second pair of rollers 305 and 306, as shown in FIGURE 21, are perpendicular to the rollers 302 and 304 and engage the rod 20 on one side. A third pair of rollers 308 and 310 engage the guide rod 20 at substantially an angle of 135°, as best seen in FIGURE 20. The rollers 308 and 310 are movably supported from the carriage frame 300 by a pair of pivotally supported arms 312 and 314 which are joined by a tension spring 316 so as to press the rollers 308 and 310 against the surface of the guide rod 20. A lower portion of the carriage frame 300 is provided with a roller 318 which engages one side of the lower guide rod 22. A roller 320 is carried on a pivoted arm 322 supported from the frame 300, the roller 320 engaging the opposite side of the lower guide rod 22. A spring 324 causes the rollers 318 and 320 to engage the lower guide rod 22 in clamping relationship.

The transducers are supported from the carriage frame 300 by a carriage riser 326 which is movably supported from the carriage frame 300 in a manner to permit the vertical position of the transducer heads 294 and 296 to be adjustable. The upper end of the riser 326 where the transducers 294 and 296 are mounted is provided with a pair of spaced rollers 328 which engage the opposing surfaces of the separated cards. The rollers 328 maintain the proper spacing between the transducers 294 and 296 and the card surfaces. By making the riser 326 vertically adjustable, the transducers can be arranged to scan a number of horizontal tracks on the surfaces of the cards.

Scanning movement is imparted to the carriage assembly 298 by a cable drive arrangement as best seen in FIGURE 1. An electric motor 330 drives a cable drum 332 through a clutch operated reversible drive transmission indicated generally at 334. Suitable electrically operated brake means is provided as indicated at 336 on the same shaft with the cable drum 332. A cable 338 is secured at one end to the carriage assembly 298. The cable extends around a drive pulley 340 to the drum 332. After taking several turns around the drum 332, the cable passes back around a guide pulley 340, passes below the carriage assembly around a spring loaded pulley 344 supported from the bracket 26. After passing around the pulley 344, the cable returns to the carriage assembly 298.

The transmission 334 is preferably provided with a pair of electrically operated clutches by which rotation in either direction can be imparted to the cable drum 332. These clutches are operated so that when the card deck is separated, one clutch energizes causing the head carriage assembly to pass between the cards in one direction toward the support bracket 26 at the front of the card selecting apparatus. Upon completion of its forward travel, the head carriage assembly causes the other clutch to be actuated, reversing the direction of travel of the head carriage assembly and returning it to its initial position as shown in FIGURE 1. The brake 336 is operated to absorb energy during the reversing operation at the forward extreme of the travel of the head carriage assembly and also to secure the head carriage assembly against movement when it is in its initial or stand-by operating position.

To permit vertical positioning of the transducers relative to the card pack so that any selected track on a particular card may be scanned, the riser 326 may be moved vertically to any selected position and held there during the scanning operation. The vertical movement is controlled as best shown in FIGURE 21. The vertical riser 326 is provided with grooves along its margins as indicated at 346. One groove is engaged by a pair of guide rollers 348 and 350 rotatably supported from the carriage frame 300. The groove on the opposite margin of the riser 326 is engaged by a roller 352 which is supported from the frame 36 by a movable linkage arm 354. A spring 356 extending between the arm 354 and an anchor point on the frame 300 urges the roller 352 into engagement with the riser 326.

While the head carriage assembly 298 is scanning between the separated pack, the riser 326 is clamped in the selected vertical position by a movable clamping member 358 which engages one margin of the riser 326 and a pair of fixed clamping members 360 and 362 which engage the opposite margin of the riser 326. The clamping members 360 and 362 are rigidly secured to the frame 300 while the movable clamping member 358 is carried on the end of a shaft 364 slidably supported by the frame 300. A compression spring 366 extends between the frame 300 and a flange 368 on the shaft 364, thus urging the shaft 364 and movable clamping member 358 into engagement with the riser 326. The spring 366 is strong enough to overcome the action of the spring 356 so as to move the riser 326 into engagement with the fixed clamping members 360 and 362.

A release arm 370 is pivotally secured to the frame 300 by a hinge support pin 372. The release arm 370 engages the flange 368 so that a downward force applied to the arm 370 at the end 374 releases the movable clamping member 358 against the action of the spring 366.

When the carriage assembly 298 is retracted to its stand-by position, the movable clamping member 358 is released to permit the riser 326 and associated transducers 294 and 296 to be adjusted vertically to the desired position for the next scanning operation. To this end, a solenoid 376 is mounted on the bracket 24 in position to operate a linkage arrangement, as best shown in FIGURE 20. The linkage arrangement includes a pivoted arm 378, one end of which includes a roller 380 which is positioned to engage the end 374 of the arm 370 when the carriage assembly is in its stand-by position. The arm 370 is connected by a pair of links 382 and 384 which are pivotally joined by a hinge pin at 386. A link 388 joins the hinge point 386 to the plunger 390 of the solenoid 376. The lower end of the linkage 384 is pivotally anchored to the frame of the machine. Thus when the solenoid 376 is energized, the linkage operates to push the roller 380 downwardly and into engagement with the arm 370, causing release of the movable clamping member 358 from the riser 326. A spring 392 causes release of the linkage when the solenoid is deenergized.

Vertical movement is imparted to the riser 326 when the carriage assembly is in the stand-by position by means of a positioning member 394. The positioning member is supported for vertical movement on a guide rod 396 supported from a vertical frame member 398 projecting upwardly from the main frame plate 10 in position adjacent the stand-by position of the carriage assembly. A roller 400, as best seen in FIGURE 1, is guided in a groove 402 in a portion of the vertical frame member 398. The roller 40 is mounted on the end of a bracket 404 extending from the positioning member 394. A bracket 406 is secured to the lower end of the vertical positioning member 394 and extends downwardly in position parallel to the riser 326. The lower end of the bracket 406 supports a U-shaped member 408, which is arranged to straddle a roller 410 rotatably supported at the lower end of the riser 326 when the carriage assembly is in its stand-by position. Thus movement of the vertical positioning member 394 transmits vertical movement to the riser 326 when the carriage is in stand-by position and the clamping member 358 is released. A flat coil spring 412 is mounted above the vertical positioning member 394 and is connected thereto, the spring 412 imparting a lifting force to the vertical positioning member. Thus the spring 412 counterbalances the weight of the riser 326 and associated transducer heads.

Vertical movement is imparted to the positioning member 394 through a rack 414 secured to the vertical positioning member 394 and an engaging pinion 416 carried on the end of a rotating shaft 418. The shaft 418 is coupled through suitable gearing (not shown) to a servo drive motor indicated generally at 420. A potentiometer 422 is also rotated by the shaft 418 through suitable gearing, the potentiometer providing a signal indicative of the position of the vertical positioning member 394 for controlling the servo motor 420. The servo drive is arranged to set the positioning member 394 and the associated riser 326 to any one of a hundred vertical positions.

Also connected to the shaft 418 at the opposite end from the gear 416 is a detent gear 424. Associated with the detent gear 424 are a pair of solenoid actuated detent levers 428 and 430 which are connected respectively to solenoids 432 and 436. The detent lever 428 is arranged to engage the notches on the detent gear 424, the spacing between the detent levers 428 and 430 is such that when the detent lever 428 is engaging a notch in the detent gear 424, the detent lever 430 is riding on the top of a tooth between adjacent notches on the detent gear 424. In this way, the detent lever 428 can be used to lock the detent gear in all the even positions while the detent lever 430 locks it in all the odd positions of the one hundred possible positions of the vertical positioning member 394 and associated riser 326.

It should be noted that the lane selection mechanism can be operated at the same time as the card selecting and deck separating mechanism is operated. Once the deck is separated at the proper card and the transducer head is set to scan the selected lane, the head carriage assembly is caused to scan across the card and is then returned to its stand-by position. When the scanning operation is complete, the clutch solenoid 100 is actuated producing another half revolution of the cams 102 and 104 causing the card deck to be brought together again to complete the cycle of operation. The operation of the mechanism, in closing the deck, is substantially the reverse of the opening operation described above.

The sequence of operation can best be understood by reference to the control circuit diagram shown in FIGURE 23. An address register 450 receives address information from any suitable source such as an associated data processor or the like. The address consists of eight binary bits designating respectively the units and tens portion of the address of the selected one of the one hundred cards in the deck. In addition, the address register receives seven bits designating the selected one of the hundred possible lanes of information on a card. In addition, a single bit designates whether the information is to be read off from the right hand or left hand card as the heads scan between the separated cards. Once the address is set in the address register 450, a start pulse is received which initiates the card selection operation. The start pulse is applied to a gating circuit 452 by means of which output levels are provided corresponding to the card address and the lane address information. The card address levels are applied from the gating circuit 452 to the finger selecting mechanism 134, by means of which the proper fingers are selected for separating the deck at the desired point, in the manner described above. At the same time, the start pulse is applied to the clutch operating solenoid 98 for starting the deck separating operation.

The lane address levels are applied to a digital-to-analog converter 454 by which an output voltage is produced having one of one hundred possible discrete levels determined by the lane address. This analog voltage is applied to a mixer 456 together with the signal derived from the servo potentiometer 422. The output mixer is amplified by a power amplifier 458 to drive the servo motor 420. The servo motor is rotated until the potentiometer 422 is positioned to balance out the signal from the digital-to-analog converter 454, thus producing a null at the output of the mixer 456.

Before the servo motor 420 can operate to adjust the position of the riser 326 and associated readout heads 294 and 296, the carriage assembly must be in stand-by position and the clamping mechanism for the riser 326 must be released. This is controlled by a relay 460 which is operated by the output of the power amplifier 458. A limit switch 462 senses when the carriage assembly is in the stand-by position. When there is an output signal from the amplifier 458, indicating that the servo motor must correct the vertical position of the riser 326, the relay 460 is energized completing a circuit to ground through the limit switch 462 and the clamping release solenoid 376. When the solenoid 376 is energized, it frees the riser 326 for adjustment vertically by the servo motor 420. Once a null condition is obtained by the servo, the relay 460 drops out, de-energizing the solenoid 376 and causing the riser 326 to be clamped in position. At the same time, the detent solenoids 432 and 436 are energized.

When the deck of cards is completely separated, the switch 292 operated by the cam 104, as best seen in FIGURE 11, is closed, completing a circuit to the carriage drive mechanism. The switch 292 is in series with the switch operated by the relay 460 so that scanning of the carriage assembly can only take place after the lane selection has been completed. A sync pulse can be derived from the closing of the switch 292 to provide synchronization for the transfer of information between the selected head and the associated digital processor. When the carriage assembly returns to its stand-by position, the limit switch 462 is again closed, energizing a pulse generator 464 to operate the reset clutch operation solenoid 100.

From the above description it will be recognized that a unique mechanism is provided for selecting at random in response to address information any one of a hundred cards stacked in a deck, separating the deck and scanning a selected one of a number of lanes of information on the card. Access to any selected lane of information in the deck of cards can be extremely rapid. Yet with a hundred cards and a hundred lanes per side of each card, a total storage of over a hundred million bits in a hundred card machine is provided.

What is claimed is:

1. A storage device comprising a plurality of cards arranged in a stack, means responsive to an address signal for automatically separating the stack between any two adjacents cards, and means scanning between the two opposing surfaces of the separated cards for sensing information on at least one of the opposing card surfaces.

2. Apparatus as defined in claim 1 wherein the stack separating means includes means for moving both portions of the divided stack relative to the sensing means, and stop means for locating the two separated portions such that the two opposing surfaces of the separated cards are always moved to fixed predetermined positions.

3. Apparatus as defined in claim 1 wherein said sensing means includes a magnetic head, and means responsive to the address signal for moving the head to any selected position relative to the surface of the cards in a direction transverse to the direction in which the head passes over the card surface, whereby the head can be caused to scan selected tracks of information on the cards.

4. An information storage unit comprising a plurality of thin cards, means for supporting the cards in a stack, means responsive to an address signal for separating the stack into two parts between any selected adjacent cards, transducer means for sensing information stored on a card, means for passing the transducer means between the two parts of the separated stack to sense information stored on the selected adjacent cards, and means for returning the parts of the stack together after the transducer means passes between the two separated parts of the stack.

5. A random access storage device comprising a stack of cards, resilient means for supporting the cards in stacked relationship but permitting the stack to spread apart, means for separating the stack between any selected two adjacent cards in response to a coded input address signal, said separating means including means for displacing the two portions of the divided deck such that the two adjacent cards of the divided portions are positioned apart at fixed predetermined locations, and transducer means for simultaneously scanning between the opposing surfaces of the two adjacent cards of the divided stack to sense information stored on the cards.

6. A storage device comprising a frame; a cartridge unit removably mounted in the frame; a stack of cards having information recorded thereon; resilient means supporting the stack in the cartridge, the resilient means permitting the stack to be parted into two separate portions at any point in the stack; indexing tabs projecting from the margins of the cards; means responsive to an electrically coded input signal for selectively engaging the tabs of any two adjacent cards and separating the stack, the separating means including first and second groups of fingers, first and second support members positioned on either side of the stack and movable towards and away from the stack in a direction transverse to the surfaces of the cards, the fingers of the two groups being respectively pivotably secured to the two support members, the fingers having lugs adapted to engage the tabs on the cards when the fingers are pivoted toward the stack, means for moving the supports away from each other to draw the two groups of fingers in opposite directions across the stack, means responsive to said input signal for selectively pivoting a finger in each of said groups to bring the associated lugs into engagement with the tabs of selected adjacent cards, the moving fingers pulling the adjacent cards apart when the lugs engage the tabs; means for holding said two adjacent cards in predetermined fixed positions relative to the frame when the stack is separated by the separating means, and means movable between the separated selected cards for sensing the information recorded on the opposing surfaces of the selected cards.

7. A storage device comprising a stack of cards having information recorded thereon; resilient means supporting the stack, the resilient means permitting the stack to be parted into two separate portions at any point in the stack; indexing tabs projecting from the margins of the cards; means responsive to an electrically coded input signal for selectively engaging the tabs of any two adjacent cards and separating the stack, the separating means including first and second groups of fingers, first and second support members positioned on either side of the stack and movable towards and away from the stack in a direction transverse to the surfaces of the cards, the fingers of the two groups being respectively pivotably secured to the two support members, the fingers having lugs adapted to engage the tabs on the cards when the fingers are pivoted toward the stack, means for moving the supports away from each other to draw the two groups of fingers in opposite directions across the stack, means responsive to said input signal for selectively pivoting a finger in each of said groups to bring the associated lugs into engagement with the tabs of selected adjacent cards, the moving fingers pulling the adjacent cards apart when the lugs engage the tabs; means for holding said two adjacent cards in predetermined fixed positions relative to the frame when the stack is separated by the separating means; and means movable between the separated selected cards for sensing the information recorded on the opposing surfaces of the selected cards.

8. Apparatus as defined in claim 7 further including means responsive to the electrically coded input signal for adjusting the position of the sensing means relative to the stack in a direction transverse to the path of movement of the sensing means, whereby the sensing means is movable over selected portions of the cards.

9. A random access memory device comprising a stack of flat cards having information recorded on the card surfaces, the cards being arranged in groups of equal numbers of cards, each card having at least one tab along one edge, the tabs of the cards in any one group being offset from each other along the margins of the cards, the positions of the tabs being repeated for each group of cards, first and second groups of fingers, the number of fingers in each group being equal to the number of cards in a group, the fingers in each group of fingers extending in a direction perpendicular to the surfaces of the cards and being spaced apart by the amount of the lateral distance between tabs of adjacent cards, the fingers having lugs adapted to engage the tabs on the cards, means for moving the first group of fingers in a direction perpendicular to the surfaces of the cards, means for moving the second group of fingers in the opposite direction to the first group and in a direction perpendicular to the surface of the cards, means responsive to a coded input signal for initially positioning said finger moving means in any selected one of a plurality of different positions corresponding to the position of a selected group of cards, whereby the lugs on the fingers are positioned by said moving means to engage the tabs in the selected group of cards, means responsive to the coded input signal for moving a selected one of said fingers in each group of fingers in a direction to move the associated lugs toward the cards and into engaging relationship with the tabs, said moving means separating the two groups of fingers to separate the stack into two portions, transducer means, means for scanning the transducer means between the separated portions of the stack to sense the information recorded on the opposing surfaces of the two separated cards, and means responsive to the coded input signal for selectively adjusting the position of the transducer means to cause scanning of different portions of the card surfaces.

10. A random access memory device comprising a stack of flat cards having information recorded on the card surfaces, the cards being arranged in groups of equal numbers of cards, each card having at least one tab along one edge, the tabs of the cards in any one group being offset from each other along the margins of the cards, the positions of the tabs being repeated for each group of cards, first and second groups of fingers, the number of fingers in each group being equal to the number of cards in a group, the fingers in each group of fingers extending in a direction perpendicular to the surfaces of the cards and being spaced apart by the amount of the lateral distance between tabs of adjacent cards, the fingers having lugs adapted to engage the tabs on the cards, means for moving the first group of fingers in a direction perpendicular to the surfaces of the cards, means for moving the second group of fingers in the opposite direction to the first group and in a direction perpendicular to the surface of the cards, means responsive to a coded input signal for initially positioning said finger moving means in any selected one of a plurality of different positions corresponding to the position of a selected group of cards, whereby the lugs on the fingers are positioned by said moving means to engage the tabs in the selected group of cards, means responsive to the coded input signal for moving a selected one of said fingers in each group of fingers in a direction to move the associated lugs toward the cards and into engaging relationship with the tabs, said moving means separating the two groups of fingers to separate the stack into two portions, transducer means, and means for scanning the transducer means between the separated portions of the stack to sense the information recorded on the opposing surfaces of the two separated cards.

11. A random access memory device comprising a stack of flat cards having information recorded on the card surfaces, the cards being arranged in groups of equal numbers of cards, each card having at least one tab along one edge, the tabs of the cards in any one group being offset from each other along the margins of the cards, the positions of the tabs being repeated for each group of cards, first and second groups of fingers, the number of fingers in each group being equal to the number of cards in a group, the fingers in each group of fingers extending in a direction perpendicular to the surfaces of the cards and being spaced apart by the amount of the lateral distance between tabs of adjacent cards, the fingers having lugs adapted to engage the tabs on the cards, means for moving the first group of fingers in a direction perpendicular to the surfaces of the cards, means for moving the second group of fingers in the opposite direction to the first group and in a direction perpendicular to the surface of the cards, means responsive to a coded input signal for initially positioning said finger moving means in any selected one of a plurality of different positions corresponding to the position of a selected group of cards, whereby the lugs on the fingers are positioned by said moving means to engage the tabs in the selected group of cards, and means responsive to the coded input signal for moving a selected one of said fingers in each group of fingers in a direction to move the associated lugs toward the cards and into engaging relationship with the tabs, said moving means separating the two groups of fingers to separate the stack into two portions.

12. A random access memory device comprising a stack of flat cards having information recorded on the card surfaces, the cards being arranged in groups of equal numbers of cards, each card having at least one tab along one edge, the tabs of the cards in any one group being offset from each other along the margins of the cards, the positions of the tabs being repeated for each group of cards, first and second groups of fingers, the number of fingers in each group being equal to the number of cards in a group, the fingers in each group of fingers extending in a direction perpendicular to the surfaces of the cards and being spaced apart by the amount of the lateral distance between tabs of adjacent cards, the fingers having lugs adapted to engage the tabs on the cards, means for moving the first group of fingers in a direction perpendicular to the surfaces of the cards, a bridging member movable in the space between the fingers and the stack, the bridging member engaging the fingers to hold the lugs out of engagement with the tabs, the margins of the bridging member controlling the position at which the selected fingers can drop down into engagement with the lugs, means responsive to a coded input signal for positioning the bridging member in any selected one of a plurality of different positions corresponding to the position of a selected group of cards, whereby the lugs on the fingers are positioned by said moving means to engage the tabs in the selected group of cards, means responsive to the coded input signal for moving a selected one of said fingers in each group of fingers in a direction to move the associated lugs toward the cards and into engaging relationship with the tabs, said moving means separating the two groups of fingers to separate the stack into two portions, transducer means, means for scanning the transducer means between the separated portions of the stack to sense the information recorded on the opposing surfaces of the two separated cards, and means responsive to the coded input signal for selectively adjusting the position of the transducer means to cause scanning of different portions of the card surfaces.

13. A random access memory device comprising a stack of flat cards having information recorded on the card surfaces, the cards being arranged in groups of equal numbers of cards, each card having at least one tab along one edge, the tabs of the cards in any one group being offset from each other along the margins of the cards, the positions of the tabs being repeated for each group of cards, first and second groups of fingers, the number of fingers in each group being equal to the number of cards in a group, the fingers in each group of fingers extending in a direction perpendicular to the surfaces of the cards and being spaced apart by the amount of the lateral distance between tabs of adjacent cards, the fingers having lugs adapted to engage the tabs on the cards, means for moving the first group of fingers in a direction perpendicular to the surfaces of the cards, a bridging member movable in the space between the fingers and the stack, the bridging member engaging the fingers to hold the lugs out of engagement with the tabs, the margins of the bridging member controlling the position at which the selected fingers can drop down into engagement with the lugs, means responsive to a coded input signal for positioning the bridging member in any selected one of a plurality of different positions corresponding to the position of a selected group of cards, whereby the lugs on the fingers are positioned by said moving means to engage the tabs in the selected group of cards, means responsive to the coded input signal for moving a selected one of said fingers in each group of fingers in a direction to move the associated lugs toward the cards and into engaging relationship with the tabs, said moving means separating the two groups of fingers to separate the stack into two portions, transducer means, and means for scanning the transducer means between the separated portions of the stack to sense the information recorded on the opposing surfaces of the two separated cards.

14. A random access memory device comprising a stack of flat cards having information recorded on the card surfaces, the cards being arranged in groups of equal numbers of cards, each card having at least one tab along one edge, the tabs of the cards in any one group being offset from each other along the margins of the cards, the positions of the tabs being repeated for each group of cards, first and second groups of fingers, the number of fingers in each group being equal to the number of cards in a group, the fingers in each group of fingers extending in a direction perpendicular to the surfaces of the cards and being spaced apart by the amount of the lateral distance between tabs of adjacent cards, the fingers having lugs adapted to engage the tabs on the cards, means for moving the first group of fingers in a direction perpendicular to the surfaces of the cards, a bridging member movable in the space between the fingers and the stack, the bridging member engaging the fingers to hold the lugs out of engagement with the tabs, the margins of the bridging member controlling the position at which the selected fingers can drop down into engagement with the lugs, means responsive to a coded input signal for positioning the bridging member in any selected one of a plurality of different positions corresponding to the position of a selected group of cards, whereby the lugs on the fingers are positioned by said moving means to engage the tabs in the selected group of cards, and means responsive to the coded input signal for moving a selected one of said fingers in each group of fingers in a direction to move the associated lugs toward the cards and into engaging relationship with the tabs, said moving means separating the two groups of fingers to separate the stack into two portions.

References Cited by the Examiner

UNITED STATES PATENTS 3,176,279 3/1965 Lin et al. ---------- 340—174.1

JAMES W. MOFFITT, *Acting Primary Examiner.*

A. I. NEUSTADT, *Assistant Examiner.*